United States Patent
Wang

(10) Patent No.: US 9,479,384 B2
(45) Date of Patent: Oct. 25, 2016

(54) DATA STREAM SCHEDULING METHOD, DEVICE, AND SYSTEM

(71) Applicant: Huawei Technologies Co., Ltd., Shenzhen, Guangdong (CN)

(72) Inventor: Jiao Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 13/930,083

(22) Filed: Jun. 28, 2013

(65) Prior Publication Data

US 2013/0332622 A1 Dec. 12, 2013

Related U.S. Application Data

(63) Continuation of application No. PCT/CN2013/070436, filed on Jan. 14, 2013.

(30) Foreign Application Priority Data

Jun. 6, 2012 (CN) .......................... 2012 1 0184197

(51) Int. Cl.
*G06F 15/16* (2006.01)
*H04L 29/06* (2006.01)
*H04L 12/721* (2013.01)

(52) U.S. Cl.
CPC ......... *H04L 29/06517* (2013.01); *H04L 45/38* (2013.01); *H04L 65/80* (2013.01)

(58) Field of Classification Search
CPC ..... H04L 65/607; H04L 65/80; H04L 29/06; H04L 45/38; H04L 47/36; G06F 15/16
USPC .................................. 709/231, 234; 370/237
See application file for complete search history.

(56) References Cited

U.S. PATENT DOCUMENTS 6,351,471 B1 * 2/2002 Robinett ............ H04N 21/8547
370/468
7,415,528 B2 * 8/2008 Choi .................. H04L 29/06027
370/516

(Continued)

FOREIGN PATENT DOCUMENTS

CN 101425943 A 5/2009
CN 101964754 A 2/2011

(Continued)

OTHER PUBLICATIONS

Minlan Yu, et al. "Scalable Flow-Based Networking with DIFANE", 28 pages.

(Continued)

*Primary Examiner* — Tesfay Yohannes

(57) ABSTRACT

Embodiments of the present invention provide a data stream scheduling method, device, and system, and relate to data processing technologies, so as to reduce a delay in a data stream scheduling process and relieve a congestion problem of a forwarding link during forwarding of a data stream, where the method includes: receiving, by a data stream scheduling entity in a network, a data packet that is currently transmitted and obtaining data stream information of a data stream where the data packet is located; determining a type of the data stream according to the data stream information; and when the data stream is a specific data stream, applying to a centralized control device in the network for an optimized forwarding policy, so as to forward the data stream, or when the data stream is a common data stream, forwarding the data stream according to a default forwarding policy.

20 Claims, 6 Drawing Sheets

(56) References Cited

U.S. PATENT DOCUMENTS

| | | | | |
|---|---|---|---|---|
| 7,421,508 | B2* | 9/2008 | Hannuksela | H04L 29/06027 370/312 |
| 7,583,600 | B1* | 9/2009 | Schanke | H04L 1/188 370/235 |
| 7,809,853 | B1* | 10/2010 | Clark | H04L 47/10 370/235 |
| 7,817,640 | B2* | 10/2010 | Yuan | H04L 12/5693 370/392 |
| 8,166,170 | B2* | 4/2012 | Segev | H04N 21/2365 370/230 |
| 8,213,768 | B2* | 7/2012 | Morioka | H04L 9/0844 386/200 |
| 8,873,453 | B2* | 10/2014 | Manapragada | H04L 65/607 370/315 |
| 2010/0061241 | A1 | 3/2010 | Sindhu et al. | |
| 2011/0314177 | A1* | 12/2011 | Harp | H04L 63/306 709/238 |
| 2012/0327778 | A1* | 12/2012 | Stanwood | H04W 72/1242 370/237 |

FOREIGN PATENT DOCUMENTS

| | | |
|---|---|---|
| CN | 102111814 A | 6/2011 |
| WO | WO 2011/131076 A1 | 10/2011 |
| WO | WO 2012/144190 A1 | 10/2012 |

OTHER PUBLICATIONS

Minlan Yu, et al. "Scalable Flow-Based Networking with DIFANE", SIGCOMM '10, Aug. 30-Sep. 3, 2010, 12 pages.

International Search Report and Written Opinion of the International Searching Authgority dated Apr. 18, 2013 in connection with International Patent Application No. PCT/CN2013/070436.

Nick McKeown, et al., "OpenFlow: Enabling Innovation in Campus Networks", Mar. 14, 2008, 6 pages.

* cited by examiner

DATA STREAM SCHEDULING METHOD, DEVICE, AND SYSTEM

CROSS-REFERENCE TO RELATED APPLICATIONS

This application is a continuation of International Application No. PCT/CN2013/070436, filed on Jan. 14, 2013, which claims priority to Chinese Patent Application No. 201210184197.X, filed on Jun. 6, 2012, both of which are hereby incorporated by reference in their entireties.

TECHNICAL FIELD

The present invention relates to data processing technologies, and in particular, to a data stream scheduling method, device, and system.

BACKGROUND

In recent years, an SDN (software defined network, Software Defined Network) has become one of important trends in network development. An objective of an SDN technology is to separate a network control plane from a data plane, and command, according to a decision of a centralized control device, a switching device in a network to perform data forwarding.

In the prior art, a centralized control device needs to make different forwarding decisions for different data streams, so that the centralized control device needs to confront processing of a great amount of data stream information, and because the centralized control device fails to timely make a forwarding decision according to a data stream, a forwarding delay of a great number of data streams is increased, and at the same time, during allocation of a forwarding link, the centralized control device may allocate multiple data streams to the same forwarding link, which leads to congestion of the forwarding link and affects service experience of a user.

SUMMARY

Embodiments of the present invention provide a data stream scheduling method, device, and system, so as to reduce a delay in a data stream scheduling process, and relieve a processing pressure of a centralized control device and a congestion problem of a forwarding link during forwarding of a data stream.

To achieve the foregoing objective, the embodiments of the present invention adopt the following technical solutions:

An embodiment of the present invention provides a data stream scheduling method, which includes:

receiving, by a data stream scheduling entity in a network, a data packet that is currently transmitted and obtaining data stream information of a data stream where the data packet is located;

determining a type of the data stream according to the data stream information, where the type of the data stream includes a specific data stream and a common data stream, the specific data stream is a data stream on which special scheduling needs to be executed to ensure the quality of service, and the common data stream is a data stream on which special scheduling does not need to be executed; and when the data stream is a specific data stream, applying to a centralized control device in the network for an optimized forwarding policy, so as to forward the data stream, or when the data stream is a common data stream, forwarding the data stream according to a default forwarding policy.

An embodiment of the present invention provides a data stream scheduling entity, which includes:

a receiving and obtaining unit, configured to receive a data packet that is currently transmitted and obtain data stream information of a data stream where the data packet is located;

a type determining unit, configured to determine a type of the data stream according to the data stream information that is obtained by the receiving and obtaining unit, where the type of the data stream includes a specific data stream and a common data stream, the specific data stream is a data stream on which special scheduling needs to be executed to ensure the quality of service, and the common data stream is a data stream on which special scheduling does not need to be executed; and an executing unit, configured to: when the type determining unit determines that the data stream is a specific data stream, apply to a centralized control device in a network for an optimized forwarding policy, so as to forward the data stream, or when the type determining unit determines that the data stream is a common data stream, forward the data stream according to a default forwarding policy.

An embodiment of the present invention provides a data stream scheduling system, which includes:

a data stream server, a centralized control device, and a network switching device, where the centralized control device is connected to the data stream server and the network switching device in a communication manner, and the data stream server is connected to the network switching device in a communication manner;

the data stream server is configured to receive a data packet that is currently transmitted and obtain data stream information of a data stream where the data packet is located; determine a type of the data stream according to the data stream information, where the type of the data stream includes a specific data stream and a common data stream, the specific data stream is a data stream on which special scheduling needs to be executed to ensure the quality of service, and the common data stream is a data stream on which special scheduling does not need to be executed; and when the data stream is a specific data stream, forward the specific data stream to the network switching device, and send policy request information to the centralized control device, or when the data stream is a common data stream, forward the common data stream to the network switching device;

the centralized control device is configured to receive the policy request information sent by the data stream server, determine a forwarding policy according to the policy request information, and send the determined forwarding policy to the network switching device; and the network switching device is configured to receive the specific data stream sent by the data stream server and the forwarding policy sent by the centralized control device, and forward the specific data stream according to the forwarding policy; or receive the common data stream sent by the data stream server, and forward the common data stream according to a preset forwarding policy.

The embodiments of the present invention provide a data stream scheduling method, device, and system, where a data stream scheduling entity receives a data packet that is currently transmitted and obtains data stream information of a data stream where the data packet is located, determines a type of the data stream according to the data stream information, and when the data stream is a specific data stream, applies to a centralized control device for an optimized forwarding policy, so as to forward the data stream, or when the data stream is a common data stream, forwards the data stream according to a default forwarding policy. In this way, the centralized control device may deliver, according to the type of the data stream, a new forwarding policy for a data stream for which a forwarding policy needs to be requested, which avoids that forwarding decisions are made for all data streams and lowers a processing pressure of the centralized control device, thereby reducing a delay in a data stream scheduling process and relieving a processing pressure of the centralized control device and a congestion problem of a forwarding link during forwarding of a data stream.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

In the specification, the embodiments to be described are applied in a network system formed by a data stream server, a centralized control device, and a network switching device, in the present invention, the inventive objective of the present invention is implemented by functionally extending the data stream server or the network switching device in the network system, and the following embodiments are a specific description of the present invention on the basis of the foregoing system architecture.

Figure 1:
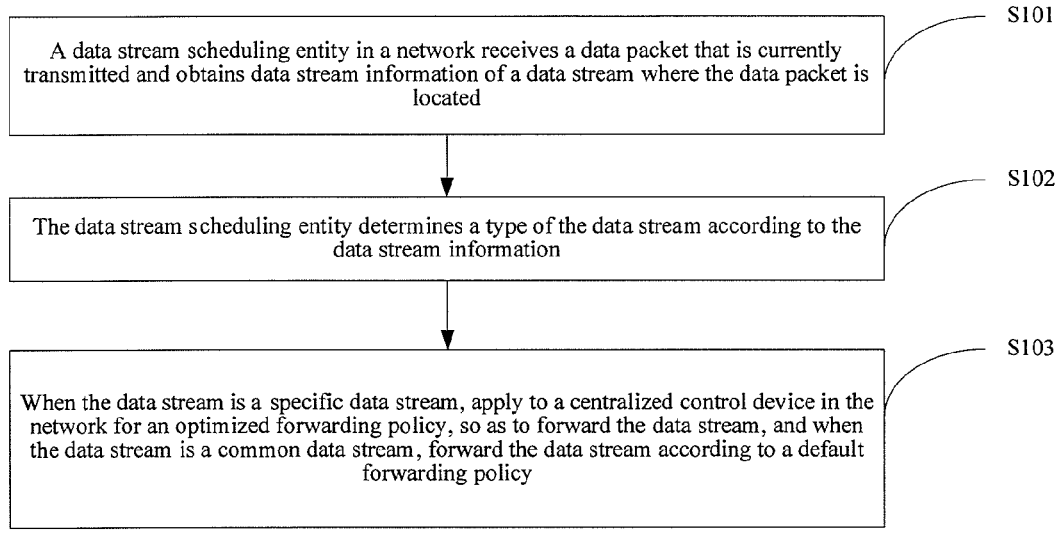
FIG. 1 is a schematic diagram of a data stream scheduling method according to an embodiment of the present invention.

An embodiment of the present invention provides a data stream scheduling method, and as shown in FIG. 1, an execution subject of this embodiment is a data stream scheduling entity, and the method includes:

S101: A data stream scheduling entity in a network receives a data packet that is currently transmitted and obtains data stream information of a data stream where the data packet is located.

The data stream information includes at least one of: the cumulative number of data packets (including the number of data packets that are currently transmitted by the data stream and the number of data packets that have already been transmitted by the data stream) transmitted by the data stream, the total cumulative traffic (including the total traffic of data packets that are currently transmitted by the data stream and the total traffic of data packets that have already been transmitted by the data stream) transmitted by the data stream, and a priority of an application or a service to which the data stream belongs.

The data stream information may further include: a source MAC address, a destination MAC address, a source IP address, a destination IP address, a source port number, a destination port number, a protocol number, a length of a data packet, a size of the data packet, a priority of the quality of service of a user network to which a data stream belongs, a security priority of the user network to which the data stream belongs, a location of a source physical device of the data stream, a location of a destination physical device of the data stream, TTL information of the data stream, an application type corresponding to a Payload (payload) part included in the data stream, and the like, which is not limited in the embodiment of the present invention.

S102: The data stream scheduling entity determines a type of the data stream according to the data stream information.

The type of the data stream includes: a specific data stream and a common data stream, where the specific data stream is a data stream on which special scheduling needs to be executed to ensure the QoS (Quality of Service, quality of service), and the common data stream is a data stream on which special scheduling does not need to be executed.

For example, the foregoing specific data stream may be the following three cases:

1. a data stream that greatly affects a network, occupies a great number of network resources, or of which a proportion of the total traffic to a bandwidth of a link that transmits the data stream is higher than a preset threshold, such as a data stream of BT (Bit Torrent, bit torrent) download or P2P (Peer-to-Peer, peer-to-peer);

2. a data stream that needs to ensure the quality of service, has a high requirement for real-time quality, and needs to transmit key data, such as a data stream of an Internet telephone call or a video conference; and 3. a data stream that does not have a high requirement for real-time quality but has a high requirement for reliability, such as a data stream of an online game or offline download.

The foregoing cases are only examples for description but are not limited in the embodiment of the present invention.

Further, a corresponding manner for the data stream scheduling entity to determine the type of the data stream varies with different information included in the data stream information.

For example, when the data stream information includes the number of data packets that are currently transmitted by the data stream and the number of data packets that have already been transmitted by the data stream, in a case that a weight of the data stream is greater than or equal to a preset weight threshold, it is determined that the type of the data stream is a specific data stream, and in a case that the weight of the data stream is smaller than the preset weight threshold, it is determined that the type of the data stream is a common data stream, where the foregoing weight is a sum of the number of data packets that are currently transmitted by the data stream and the number of data packets that have already been transmitted by the data stream, and the foregoing preset weight threshold is a preset threshold of the cumulative number of data packets transmitted by the data stream, where the preset threshold is preset by a user according to a practical application or an experience value.

For example, when the data stream information includes the total traffic of data packets that are currently transmitted by the data stream and the total traffic of data packets that have already been transmitted by the data stream, in a case that a weight of the data stream is greater than or equal to a preset weight threshold, it is determined that the type of the data stream is a specific data stream, and in a case that the weight of the data stream is smaller than the preset weight threshold, it is determined that the type of the data stream is a common data stream, where the foregoing weight is a sum of the total traffic of data packets that are currently transmitted by the data stream and the total traffic of data packets that have already been transmitted by the data stream, and the foregoing preset weight threshold is a preset threshold of the cumulative total traffic transmitted by the data stream, where the preset threshold is preset by a user according to a practical application or an experience value.

For example, when the data stream information includes a priority of the data stream, where the priority of the data stream is used to indicate a priority of an application or a service to which the data stream belongs, in a case that the priority of the data stream is higher than or equal to a weight threshold, the type of the data stream is a specific data stream, and in a case that the priority of the data stream is lower than the weight threshold, the type of the data stream is a common data stream, where the foregoing weight threshold is a preset threshold of a priority, where the preset threshold is preset by a user according to a practical application or an experience value.

It should be noted that, the foregoing examples of determining the type of the data stream are only examples for description, to which the embodiment of the present invention is not limited. The type of the data stream is determined specifically according to information included in the data stream. In addition, when the data stream information includes multiple pieces of information used to determine the type of the data stream (for example, the data stream information includes the cumulative number of data packets transmitted by the data stream, the total cumulative traffic transmitted by the data stream, and the priority of the application or the service to which the data stream belongs), the data stream scheduling entity determines the type of the data stream according to a priority that is preset according to a practical application or an experience value. For example, if a user presets that the cumulative number of data packets transmitted by the data stream has a high priority, even though the data stream information includes the cumulative number of data packets transmitted by the data stream, the total cumulative traffic transmitted by the data stream, and the priority of the application or the service to which the data stream belongs, the data stream scheduling entity still determines the type of the data stream according to the cumulative number of data packets transmitted by the data stream, and a specific determining process has been described in this embodiment and is not described herein again.

S103: When the data stream is a specific data stream, apply to a centralized control device in the network for an optimized forwarding policy, so as to forward the data stream, or when the data stream is a common data stream, forward the data stream according to a default forwarding policy.

Specifically, in a case that the data stream is a specific data stream, two situations are described:

Situation 1: When the type of the data stream is a specific data stream and the data stream is determined as a specific data stream for the first time, policy request information is sent to the centralized control device, so as to forward the specific data stream according to a forwarding policy that is determined by the centralized control device after the policy request information is received.

When the type of the data stream is a specific data stream, the data stream scheduling entity determines, according to the data stream information of the data stream where the data packet that is currently transmitted is located, data stream information of a data stream where a data packet that is previously transmitted is located, and the weight threshold, that the data stream is determined as a specific data stream for the first time;

for example, if it is determined, according to the data stream information of the data stream where the data packet that is currently transmitted is located and the weight threshold, that the data stream is a specific data stream, while it is determined, according to the data stream information of the data stream where the data packet that is previously transmitted is located and the weight threshold, that the data stream is a common data stream, it is determined that the data stream is determined as a specific data stream for the first time; and if it is determined, according to the data stream information of the data stream where the data packet is previously transmitted is located and the weight threshold, that the data stream is still a specific data stream, the data stream is not determined as a specific data stream for the first time, and at this time, reference may be made to a situation 2.

Situation 2: When the type of the data stream is a specific data stream and the data stream is not determined as a specific data stream for the first time, the data stream is forwarded to a network switching device, so that the network switching device forwards the specific data stream according to a preset forwarding policy.

Further, for the foregoing situation 1, if the data stream scheduling entity is implemented in a data stream server through a software program, the data stream scheduling entity sends policy request information to the centralized control device, so as to request the centralized control device to determine a forwarding policy for the specific data stream, and sends the forwarding policy determined by the centralized control device to the network switching device in the network, and the data stream scheduling entity sends the specific data stream to the network switching device, so that the network switching device forwards the specific data stream according to the forwarding policy determined by the centralized control device.

A forwarding table is set in the network switching device and records correspondence between a data stream and a forwarding policy.

In addition, the centralized control device determines a forwarding policy for the specific data stream, which may specifically be that the centralized control device obtains a preferred forwarding policy for the data stream according to information of each node in a network system, received message header information of the data stream (a source address or a destination address of the data stream), and a preset forwarding path in an allocated preset forwarding policy.

If the data stream scheduling entity is implemented in the network switching device through a hardware module, the data stream scheduling entity sends policy request information to the centralized control device, so as to request the centralized control device to determine a forwarding policy for the specific data stream and send the forwarding policy to the data stream scheduling entity.

The data stream scheduling entity receives the forwarding policy sent by the centralized control device, writes the forwarding policy into a forwarding table stored by the data stream scheduling entity, and sends the specific data stream according to the forwarding policy.

Further, when it is determined that the data stream is a common data stream, the data stream scheduling entity forwards the common data stream to the network switching device, so that the network switching device forwards the common data stream according to a default forwarding policy, and the centralized control device no longer need to deliver a new forwarding rule for the common data stream, and in addition, the default forwarding policy is also allocated by the centralized control device.

After determining the type of the data stream according to step S102, the foregoing data stream scheduling entity changes a stream flag bit of the data stream to record the type of the data stream, for example, if it is determined that the data stream is a specific data stream, sets a value of the stream flag bit to 1, and if it is determined that the data stream is a common data stream, sets the value of the stream flag bit to 0, to which the embodiment of the present invention is not limited.

It should be noted that, the centralized control device periodically updates system state information and compares the system state information with a preset response threshold stored in the centralized control device, where the system state information may be topology information of the network system, or information of the total traffic transmitted by the network system, or information of a bandwidth occupied by a transmission resource in the network system, or preset delay requirement information of an end-to-end link, or the like. When the system state information reaches or exceeds the preset response threshold, it indicates that a data transmission environment of the network system needs to be optimized, and the data transmission environment of the network system may be optimized by adopting the data stream scheduling method provided in this embodiment. When the system state information does not reach or exceed the preset response threshold, it indicates that the data transmission environment of the network system is better, and even a specific data stream cannot affect data transmission of the network system; therefore, the network system may perform data stream forwarding according to the method in the prior art, which is not described again in this embodiment. In this way, the centralized control device can flexibly determine a forwarding policy of the data stream according to a current system state and lowering a pressure of the centralized control device, which saves a network resource and improves forwarding efficiency of the data stream.

By adopting the data stream scheduling method provided in the foregoing embodiment, a centralized control device may deliver, according to a type of a data stream, a new forwarding policy for a data stream for which a forwarding policy needs to be requested, which avoids that forwarding decisions are made for all data streams and lowers a processing pressure of the centralized control device, thereby reducing a delay in a data stream scheduling process and relieving the processing pressure of the centralized control device and a congestion problem of a forwarding link during forwarding of a data stream.

Figure 2:
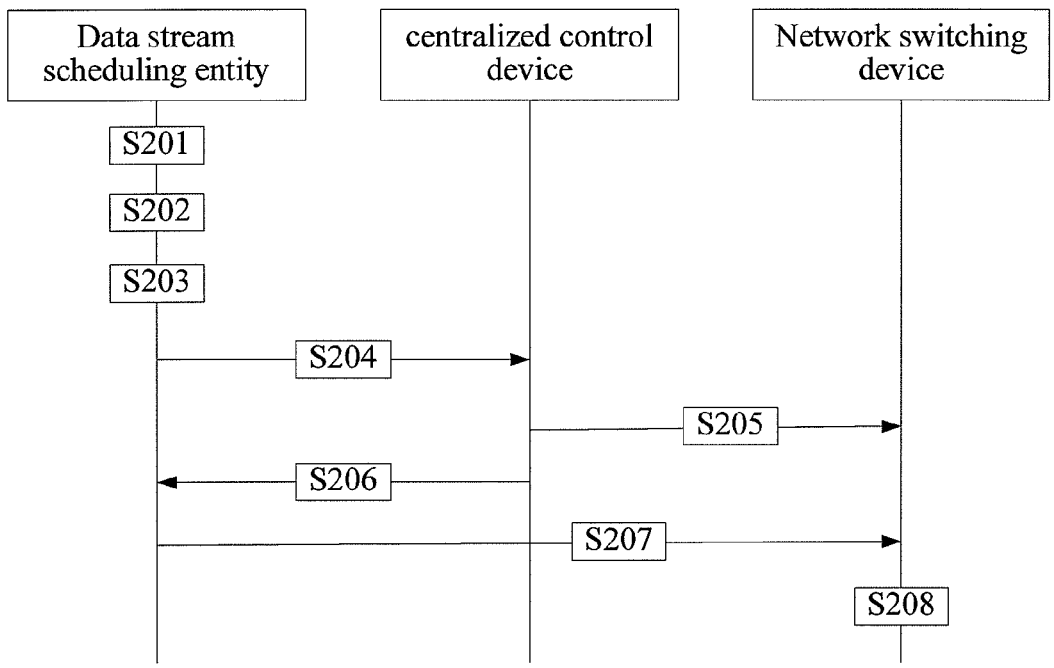
FIG. 2 is a schematic flow chart of a data stream scheduling method according to an embodiment of the present invention.

An embodiment of the present invention provides another data stream scheduling method, and as shown in FIG. 2, the data stream scheduling entity in this embodiment is implemented in a data stream server through a software program, and specific steps include:

S201: A data stream scheduling entity in a network receives a data packet that is currently transmitted and obtains data stream information of a data stream where the data packet is located.

The data stream scheduling entity may receive the data stream from a VM (Virtual Machine, virtual machine) in the data stream server.

The data stream information includes at least one of: the cumulative number of data packets (including the number of data packets that are currently transmitted by the data stream and the number of data packets that have already been transmitted by the data stream) transmitted by the data stream, the total cumulative traffic (including the total traffic of data packets that are currently transmitted by the data stream and the total traffic of data packets that have already been transmitted by the data stream) transmitted by the data stream, and a priority of an application or a service to which the data stream belongs.

Definitely, the data stream information may further include: a source MAC address, a destination MAC address, a source IP address, a destination IP address, a source port number, a destination port number, a protocol number, a length of a data packet, a size of the data packet, a priority of the quality of service of a user network to which a data stream belongs, a security priority of the user network to which the data stream belongs, a location of a source physical device of the data stream, a location of a destination physical device of the data stream, TTL information of the data stream, and an application type corresponding to a Payload (payload) part included in the data stream, which is not limited in the embodiment of the present invention.

It should be noted that, this embodiment is performed in a case that a centralized control device compares periodically obtained system state information with a preset response threshold stored in the centralized control device, and determines that the system state information reaches or exceeds the preset response threshold, and when the system state information does not reach or exceed the preset response threshold, it indicates that a data transmission environment of a network system is better, and even a specific data stream cannot affect data transmission of the network system; therefore, the network system may perform data stream forwarding according to the method in the prior art, which is not described again in this embodiment.

S202: The data stream scheduling entity determines a type of the data stream according to the data stream information.

The type of the data stream includes: a specific data stream and a common data stream, where the specific data stream is a data stream on which special scheduling needs to be executed to ensure the QoS, and the common data stream is a data stream on which special scheduling does not need to be executed.

For example, the foregoing specific data stream may be the following three cases:

1. a data stream that greatly affects a network, occupies a great number of network resources, or of which a proportion of the total traffic to a bandwidth of a link that transmits the data stream is higher than a preset threshold, such as a data stream of BT download or P2P;

2. a data stream that needs to ensure the quality of service, has a high requirement for real-time quality, and needs to transmit key data, such as a data stream of an Internet telephone call or a video conference; and 3. a data stream that does not have a high requirement for real-time quality but has a high requirement for reliability, such as a data stream of an online game or offline download.

The foregoing cases are only examples for description but are not limited in the embodiment of the present invention.

Preferably, after determining the type of the data stream according to step S202, the foregoing data stream scheduling entity changes a stream flag bit of the data stream to record the type of the data stream, for example, if it is determined that the data stream is a specific data stream, sets a value of the stream flag bit to 1, and if it is determined that the data stream is a common data stream, sets the value of the stream flag bit to 0, to which the embodiment of the present invention is not limited.

When it is determined, according to step S202, that the type of the data stream is a specific data stream, step S203 to step S208 are executed.

When it is determined, according to step S202, that the type of the data stream is a common data stream, a network switching device forwards a received common data stream according to a preset forwarding policy.

S203: The data stream scheduling entity determines, according to the data stream information of the data stream where the data packet that is currently transmitted is located and data stream information of a data stream where a data packet that is previously transmitted is located, and a weight threshold, that the data stream is a specific data stream determined for the first time.

S204: The data stream scheduling entity sends policy request information to a centralized control device, so as to request the centralized control device to determine a forwarding policy for the specific data stream.

Further, that the centralized control device determines a forwarding policy for the specific data stream, which may specifically be that the centralized control device obtains a preferred forwarding policy for the data stream through calculation according to information of each node in a network system, received message header information of the data stream (a source address or a destination address of the data stream), and a default forwarding path in an allocated default forwarding policy.

S205: The centralized control device sends the determined forwarding policy to a network switching device in the network.

S206: The centralized control device sends policy request response information to the data stream scheduling entity.

S207: After receiving the policy request response information, the data stream scheduling entity sends the specific data stream to the network switching device.

S208: The network switching device forwards the specific data stream according to the forwarding policy that is written into a forwarding table.

The forwarding table is set in the network switching device and records correspondence between a data stream and a forwarding policy.

By adopting the data stream scheduling method provided in the foregoing embodiment, a centralized control device may deliver, according to a type of a data stream, a new forwarding policy for a data stream for which a forwarding policy needs to be requested, which avoids that forwarding decisions are made for all data streams and lowers a processing pressure of the centralized control device, thereby reducing a delay in a data stream scheduling process and relieving the processing pressure of the centralized control device and a congestion problem of a forwarding link during forwarding of a data stream.

It should be noted that, for the foregoing method embodiments, for the brevity of description, the method embodiments are described as a series of action combinations; however, persons skilled in the art should know that, the present invention is not limited by a sequence of described actions, because according to the present invention, some steps may be performed by adopting other sequences or performed simultaneously. Secondly, persons skilled in the art should also know that, the embodiments described in the specification all belong to exemplary embodiments, and related actions and modules are not essentially necessary in the present invention.

Figure 3:
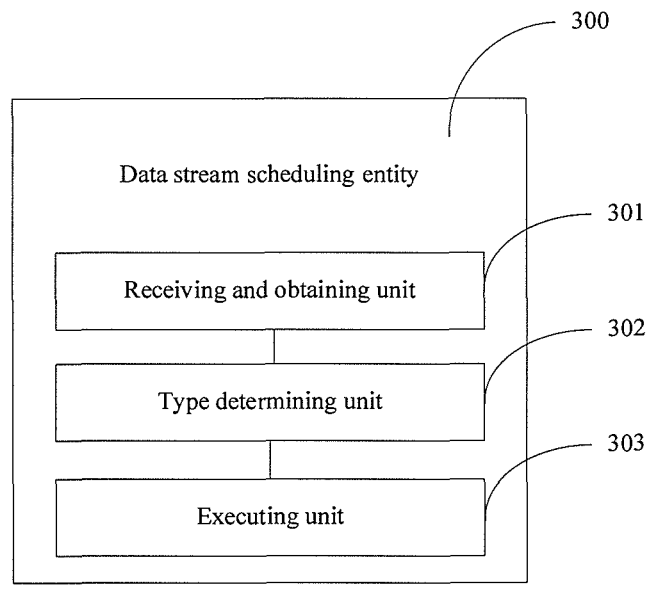
FIG. 3 is a schematic structural diagram of a data stream scheduling entity according to an embodiment of the present invention.

An embodiment of the present invention provides a data stream scheduling entity 300, as shown in FIG. 3, which includes:

A receiving and obtaining unit 301 is configured to receive a data packet that is currently transmitted and obtain data stream information of a data stream where the data packet is located.

The data stream information includes at least one of: the cumulative number of data packets (including the number of data packets that are currently transmitted by the data stream and the number of data packets that have already been transmitted by the data stream) transmitted by the data stream, the total cumulative traffic (including the total traffic of data packets that are currently transmitted by the data stream and the total traffic of data packets that have already been transmitted by the data stream) transmitted by the data stream, and a priority of an application or a service to which the data stream belongs.

Definitely, the data stream information may further include: a source MAC address, a destination MAC address, a source IP address, a destination IP address, a source port number, a destination port number, a protocol number, a length of a data packet, a size of the data packet, a priority of the quality of service of a user network to which a data stream belongs, a security priority of the user network to which the data stream belongs, a location of a source physical device of the data stream, a location of a destination physical device of the data stream, TTL information of the data stream, and an application type corresponding to a Payload (payload) part included in the data stream, which is not limited in the embodiment of the present invention.

A type determining unit 302 is configured to determine a type of the data stream according to the data stream information that is obtained by the receiving and obtaining unit 301.

The type of the data stream includes: a specific data stream and a common data stream, where the specific data stream is a data stream on which special scheduling needs to be executed to ensure the QoS, and the common data stream is a data stream on which special scheduling does not need to be executed.

For example, the foregoing specific data stream may be the following three cases:

1. a data stream that greatly affects a network, occupies a great number of network resources, or of which a proportion of the total traffic to a bandwidth of a link that transmits the data stream is higher than a preset threshold, for example, a data stream of BT download or P2P;

2. a data stream that needs to ensure the quality of service, has a high requirement for real-time quality, and needs to transmit key data, such as a data stream of an Internet telephone call or a video conference; and 3. a data stream that does not have a high requirement for real-time quality but has a high requirement for reliability, such as a data stream of an online game or offline download.

An executing unit 303 is configured to: when the type determining unit 302 determines that the data stream is a specific data stream, apply to a centralized control device in the network for an optimized forwarding policy, so as to forward the data stream, or when the type determining unit 302 determines that the data stream is a common data stream, forward the data stream according to a default forwarding policy.

For example, when the data stream information includes the number of data packets that are currently transmitted by the data stream and the number of data packets that have already been transmitted by the data stream, the type determining unit is specifically configured to:

if a weight of the data stream is greater than or equal to a preset weight threshold, determine that the type of the data stream is a specific data stream, where the weight is a sum of the number of data packets that are currently transmitted by the data stream and the number of data packets that have already been transmitted by the data stream; and if the weight of the data stream is smaller than the preset weight threshold, determine that the type of the data stream is a common data stream.

For example, when the data stream information includes the total traffic of data packets that are currently transmitted by the data stream and the total traffic of data packets that have already been transmitted by the data stream, the type determining unit is specifically configured to: if a weight of the data stream is greater than or equal to a preset weight threshold, determine that the type of the data stream is a specific data stream, where the weight is a sum of the total traffic of data packets that are currently transmitted by the data stream and the total traffic of data packets that have already been transmitted by the data stream; and if the weight of the data stream is smaller than the preset weight threshold, determine that the type of the data stream is a common data stream.

For example, when the data stream information includes a priority of the data stream, where the priority of the data stream is used to indicate a priority of an application or a service to which the data stream belongs, the type determining unit is specifically configured to:

if the priority of the data stream is higher than or equal to a weight threshold, determine that the type of the data stream is a specific data stream; or if the priority of the data stream is lower than the weight threshold, determine that the type of the data stream is a common data stream.

Figure 4:
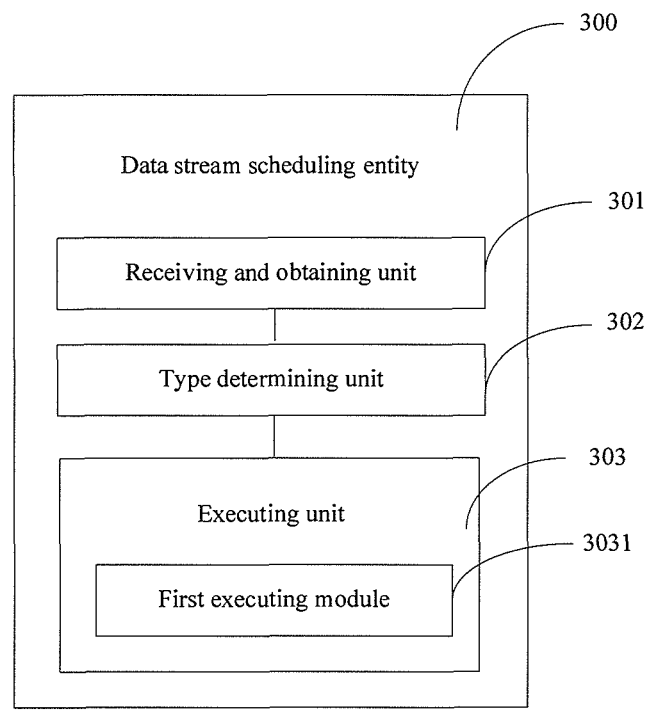
FIG. 4 is a schematic structural diagram of another data stream scheduling entity according to an embodiment of the present invention.

Further, as shown in FIG. 4, the executing unit 303 further includes:

a first executing module 3031, configured to, when the type of the data stream is a specific data stream and the data stream is determined as a specific data stream for the first time, send policy request information to the centralized control device, so as to forward the specific data stream according to a forwarding policy that is determined by the centralized control device after the policy request information is received.

Further, the first executing module 3031 is further configured to: when the type of the data stream is a specific data stream and the data stream is not determined as a specific data stream for the first time, forward the data stream to a network switching device, so that the network switching device forwards the specific data stream according to a preset forwarding policy.

Figure 5:
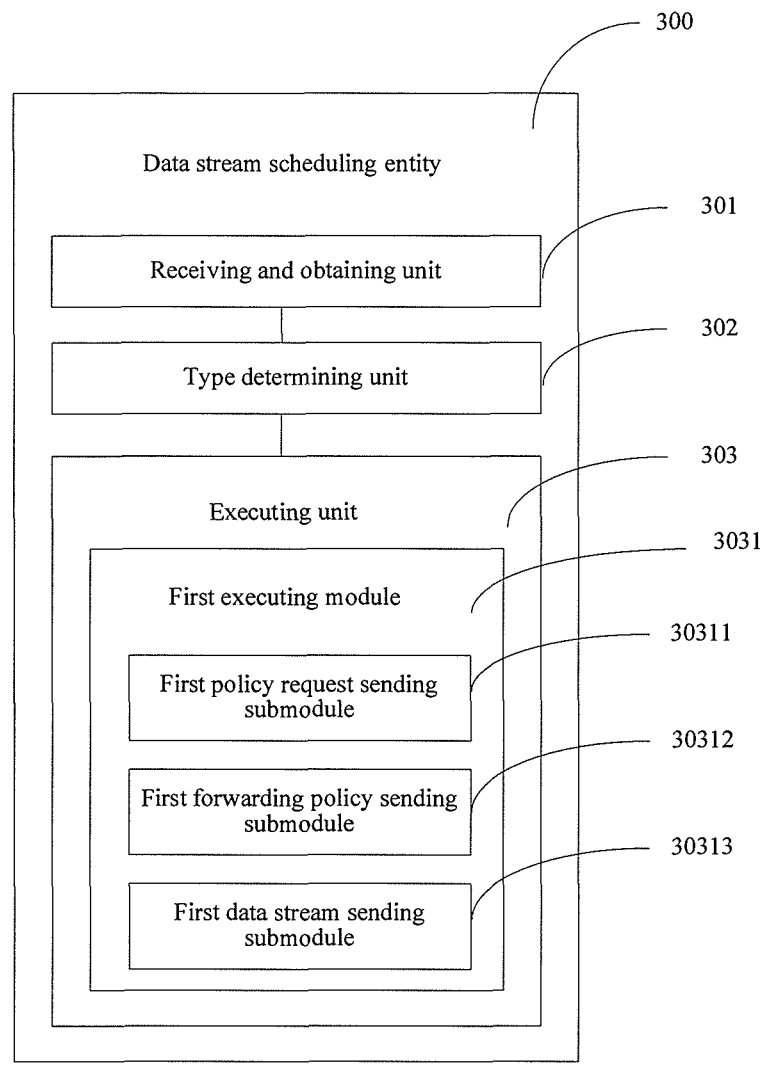
FIG. 5 is a schematic structural diagram of another data stream scheduling entity according to an embodiment of the present invention.

For example, as shown in FIG. 5, if the data stream scheduling entity is implemented in a data stream server through a software program, the first executing module 3031 specifically includes:

a first policy request sending submodule 30311, configured to send policy request information to the centralized control device, so as to request the centralized control device to determine a forwarding policy for the specific data stream;

a first forwarding policy sending submodule 30312, configured to send the forwarding policy determined by the centralized control device to the network switching device in the network; and a first data stream sending submodule 30313, configured to send the specific data stream to the network switching device, so that the network switching device forwards the specific data stream according to the forwarding policy determined by the centralized control device.

Figure 6:
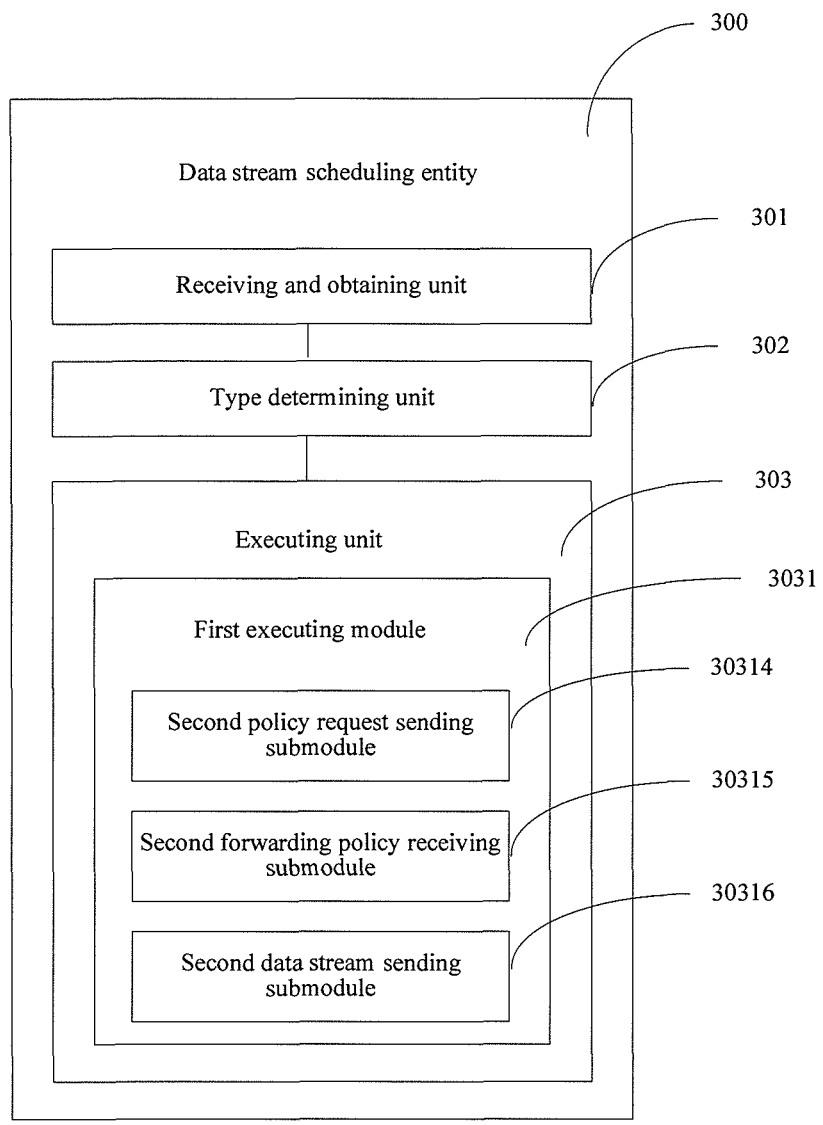
FIG. 6 is a schematic structural diagram of another data stream scheduling entity according to an embodiment of the present invention.

For example, as shown in FIG. 6, if the data stream scheduling entity is implemented in the network switching device through a hardware module, the first executing module 3031 specifically includes:

a second policy request sending submodule 30314, configured to send policy request information to the centralized control device, so as to request the centralized control device to determine a forwarding policy for the specific data stream and send the forwarding policy to the data stream scheduling entity;

a second forwarding policy receiving submodule 30315, configured to receive the forwarding policy sent by the centralized control device and write the forwarding policy into a forwarding table stored by the data stream scheduling entity; and a second data stream sending submodule 30316, configured to send the specific data stream according to the forwarding policy.

Figure 7:
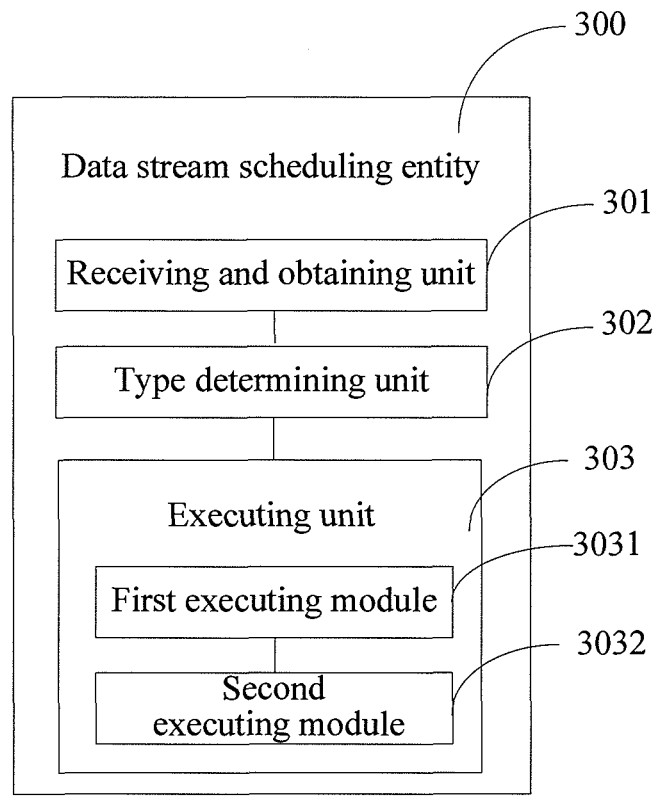
FIG. 7 is a schematic structural diagram of another data stream scheduling entity according to an embodiment of the present invention.

Further, as shown in FIG. 7, the executing unit 303 further includes:

a second executing module 3032, configured to: when the type of the data stream is a common data stream, forward the common data stream to the network switching device in the network, so that the network switching device forwards the common data stream according to a preset forwarding policy.

It should be noted that, persons skilled in the art may clearly understand that, for the convenience and brevity of the description, reference may be made to a corresponding process in the method embodiments for a specific working process of the entity described in the following, which is not described herein again. By adopting the data stream scheduling entity provided in the foregoing embodiment, the data stream scheduling entity determines a type of a data stream, so that a centralized control device may deliver, according to the type of the data stream, a new forwarding policy for a data stream for which a forwarding policy needs to be requested, which avoids that forwarding decisions are made for all data streams and lowers a processing pressure of the centralized control device, thereby reducing a delay in a data stream scheduling process and relieving the processing pressure of the centralized control device and a congestion problem of a forwarding link during forwarding of a data stream.

Figure 8:
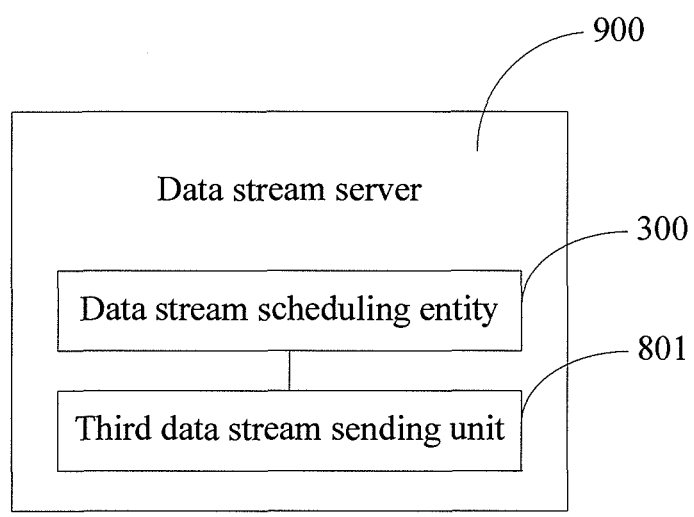
FIG. 8 shows a data stream server according to an embodiment of the present invention.

An embodiment of the present invention provides a data stream server 800, as shown in FIG. 8, which includes: the data stream scheduling entity 300 described in the foregoing embodiments shown in FIG. 3, FIG. 4, and FIG. 6 and a third data stream sending unit 801, where the third data stream sending unit 801 is configured to send a data stream to a network switching device.

It should be noted that, the data stream scheduling entity 300 described in the foregoing embodiments shown in FIG. 3, FIG. 4, and FIG. 6 is applied to the foregoing data stream scheduling method, and units in the device also correspond to the steps in the method.

By adopting the data stream server provided in the foregoing embodiment, the data stream server determines a type of a data stream, so that a centralized control device may deliver, according to the type of the data stream, a new forwarding policy for a data stream for which a forwarding policy needs to be requested, which avoids that forwarding decisions are made for all data streams and lowers a processing pressure of the centralized control device, thereby reducing a delay in a data stream scheduling process and relieving the processing pressure of the centralized control device and a congestion problem of a forwarding link during forwarding of a data stream.

Figure 9:
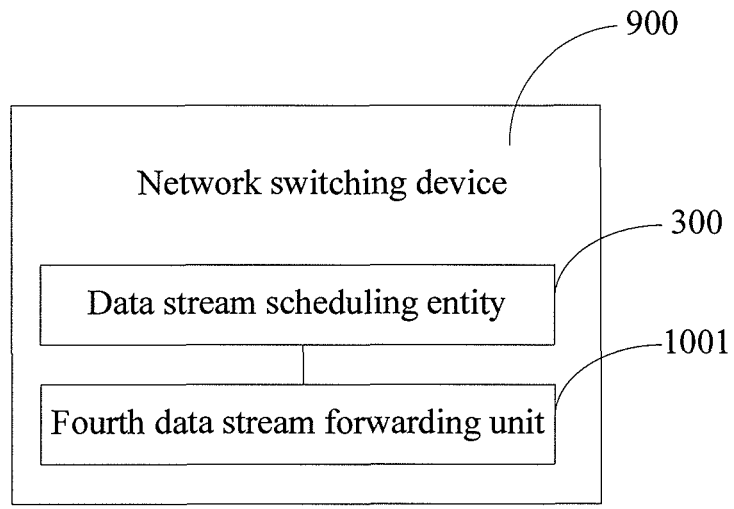
FIG. 9 shows a network switching device according to an embodiment of the present invention.

An embodiment of the present invention provides a network switching device 900, as shown in FIG. 9, which includes: the data stream scheduling entity 300 described in the foregoing embodiments shown in FIG. 3, FIG. 5, and FIG. 6 and a fourth data stream forwarding unit 901, where the fourth data stream forwarding unit 901 is configured to forward a data stream.

It should be noted that, the data stream scheduling entity 300 described in the foregoing embodiments shown in FIG. 3, FIG. 5, and FIG. 6 is applied to the foregoing data stream scheduling method, and units in the device also correspond to the steps in the method.

By adopting the network switching device provided in the foregoing embodiment, the network switching device determines a type of a data stream, so that a centralized control device may deliver, according to the type of the data stream, a new forwarding policy for a data stream for which a forwarding policy needs to be requested, which avoids that forwarding decisions are made for all data streams and lowers a processing pressure of the centralized control device, thereby reducing a delay in a data stream scheduling process and relieving the processing pressure of the centralized control device and a congestion problem of a forwarding link during forwarding of a data stream.

Figure 10:
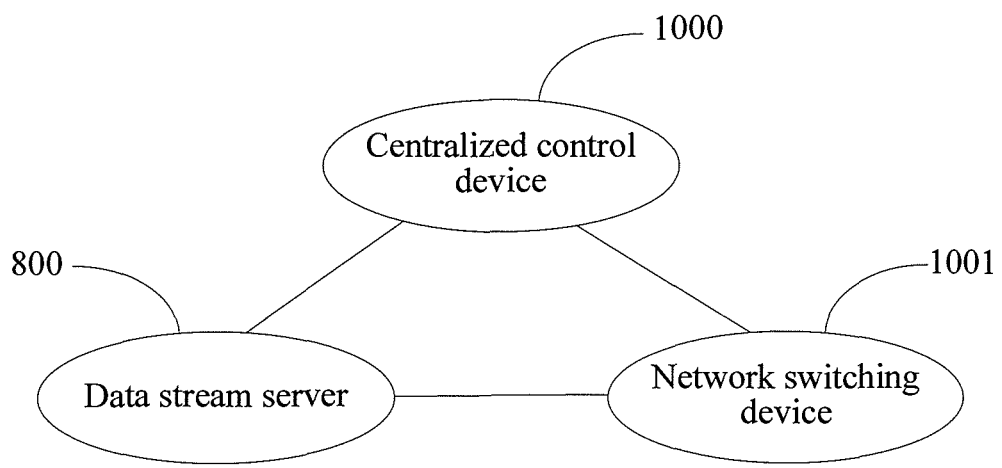
FIG. 10 shows a data stream scheduling system according to an embodiment of the present invention.

An embodiment of the present invention provides a data stream scheduling system, as shown in FIG. 10, which includes: the data stream server 800 described in the foregoing embodiment, a centralized control device 1000, and a network switching device 1001, where the centralized control device 1000 is connected to the data stream server 800 and the network switching device 1001 in a communication manner, and the data stream server 800 is connected to the network switching device 1001 in a communication manner;

the data stream server 800 is configured to receive a data packet that is currently transmitted and obtain data stream information of a data stream where the data packet is located; determine a type of the data stream according to the data stream information, where the type of the data stream includes a specific data stream and a common data stream, the specific data stream is a data stream on which special scheduling needs to be executed to ensure the quality of service, and the common data stream is a data stream on which special scheduling does not need to be executed; and when the data stream is a specific data stream, forward the specific data stream to the network switching device 1001, and send policy request information to the centralized control device 1000, or when the data stream is a common data stream, forward the common data stream to the network switching device 1001;

the centralized control device 1000 is configured to receive the policy request information sent by the data stream server 800, determine a forwarding policy according to the policy request information, and send the determined forwarding policy to the network switching device 1001; and the network switching device 1001 is configured to receive the specific data stream sent by the data stream server 800 and the forwarding policy sent by the centralized control device 1000, and forward the specific data stream according to the forwarding policy; or receive the common data stream sent by the data stream server, and forward the common data stream according to a preset forwarding policy.

The type of the data stream includes: a specific data stream and a common data stream, where the specific data stream is a data stream on which special scheduling needs to be executed to ensure the QoS, and the common data stream is a data stream on which special scheduling does not need to be executed.

For example, the foregoing specific data stream may be the following three cases:

1. a data stream that greatly affects a network, occupies a great number of network resources, or of which a proportion of the total traffic to a bandwidth of a link that transmits the data stream is higher than a preset threshold, such as a data stream of BT download or P2P;

2. a data stream that needs to ensure the quality of service, has a high requirement for real-time quality, and needs to transmit key data, such as a data stream of an Internet telephone call or a video conference; and 3. a data stream that does not have a high requirement for real-time quality but has a high requirement for reliability, such as a data stream of an online game or offline download.

The foregoing cases are only examples for description but are not limited in the embodiment of the present invention.

Further, the centralized control device 1000 is further configured to send a forwarding policy to the network switching device 1001 when it is determined, according to obtained system state information, that the system state information reaches or exceeds a preset response threshold.

Specifically, the centralized control device periodically updates system state information and compares the system state information with a preset response threshold stored in the centralized control device, where the system state information may be topology information of a network system, or information of the total traffic transmitted by the network system, or information of a bandwidth occupied by a transmission resource in the network system, or preset delay requirement information of an end-to-end link, or the like. When the system state information reaches or exceeds the preset response threshold, it indicates that a data transmission environment of the network system needs to be optimized, and the data transmission environment of the network system may be optimized by adopting the data stream scheduling method provided in the embodiment. When the system state information does not reach or exceed the preset response threshold, it indicates that the data transmission environment of the network system is better, and even a specific data stream cannot affect data transmission of the network system; therefore, the network system may perform data stream forwarding according to the method in the prior art, which is not described again in this embodiment. In this way, the centralized control device can flexibly determine a forwarding policy of the data stream according to a current system state and lowering a pressure of the centralized control device, which saves a network resource and improves forwarding efficiency of the data stream.

It should be noted that, the foregoing data stream server is applied to the foregoing data stream scheduling method, and units in the device also correspond to the steps in the method.

By adopting the data stream scheduling system provided in the foregoing embodiment, a centralized control device may deliver, according to a type of a data stream, a new forwarding policy for a data stream for which a forwarding policy needs to be requested, which avoids that forwarding decisions are made for all data streams and lowers a processing pressure of the centralized control device, thereby reducing a delay in a data stream scheduling process and relieving the processing pressure of the centralized control device and a congestion problem of a forwarding link during forwarding of a data stream.

Figure 11:
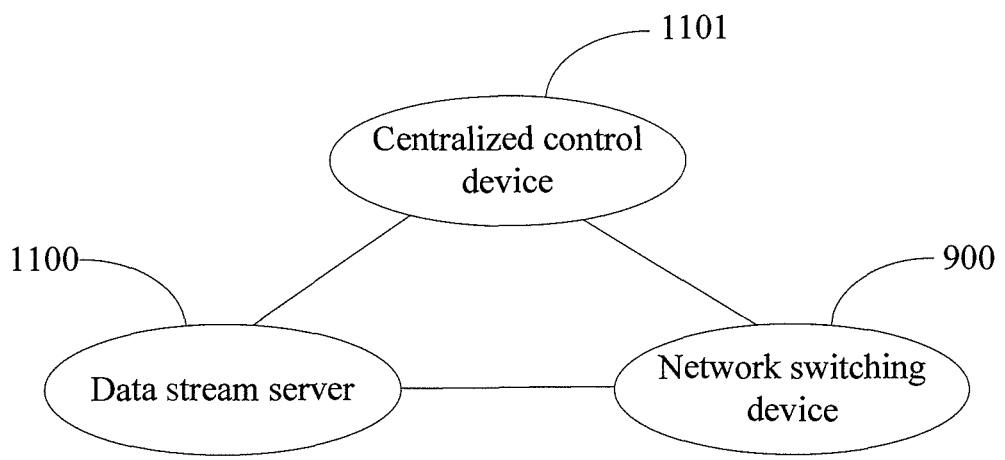
FIG. 11 shows another data stream scheduling system according to an embodiment of the present invention.

An embodiment of the present invention provides a data stream scheduling system, as shown in FIG. 11, which includes: a data stream server 1100, a centralized control device 1101, and the network switching device 900 described in the foregoing embodiment, where the data stream server 1100 is configured to send a data stream to a network switching device 800; and the centralized control device 1101 is configured to: when the data stream server 1100 determines that a type of a data stream that is currently transmitted by the data stream server is a specific data stream determined for the first time, receive policy request information sent by the data stream server 1100 and send a forwarding policy that is determined according to the policy request information to the network switching device.

The type of the data stream includes: a specific data stream and a common data stream, where the specific data stream is a data stream on which special scheduling needs to be executed to ensure the QoS, and the common data stream is a data stream on which special scheduling does not need to be executed.

For example, the foregoing specific data stream may be the following three cases:

1. a data stream that greatly affects a network, occupies a great number of network resources, or of which a proportion of the total traffic to a bandwidth of a link that transmits the data stream is higher than a preset threshold, such as a data stream of BT download or P2P;

2. a data stream that needs to ensure the quality of service, has a high requirement for real-time quality, and needs to transmit key data, such as a data stream of an Internet telephone call or a video conference; and 3. a data stream that does not have a high requirement for real-time quality but has a high requirement for reliability, such as a data stream of an online game or offline download.

The foregoing cases are only examples for description but are not limited in the embodiment of the present invention.

Further, the centralized control device 1101 is further configured to send a forwarding policy to the network switching device 900 when it is determined, according to obtained system state information, that the system state information reaches or exceeds a preset response threshold.

Specifically, the centralized control device periodically updates system state information and compares the system state information with a preset response threshold stored in the centralized control device, where the system state information may be topology information of a network system, or information of the total traffic transmitted by the network system, or information of a bandwidth occupied by a transmission resource in the network system, or preset delay requirement information of an end-to-end link, or the like. When the system state information reaches or exceeds the preset response threshold, it indicates that a data transmission environment of the network system needs to be optimized, and the data transmission environment of the network system may be optimized by adopting the data stream scheduling method provided in the embodiment. When the system state information does not reach or exceed the preset response threshold, it indicates that the data transmission environment of the network system is better, and even a specific data stream cannot affect data transmission of the network system; therefore, the network system may perform data stream forwarding according to the method in the prior art, which is not described again in this embodiment. In this way, the centralized control device can flexibly determine a forwarding policy of the data stream according to a current system state and lowering a pressure of the centralized control device, which saves a network resource and improves forwarding efficiency of the data stream.

It should be noted that, the foregoing network switching device is applied to the foregoing data stream scheduling method, and units in the device also correspond to the steps in the method.

By adopting the data stream scheduling system provided in the foregoing embodiment, a centralized control device may deliver, according to a type of a data stream, a new forwarding policy for a data stream for which a forwarding policy needs to be requested, which avoids that forwarding decisions are made for all data streams and lowers a processing pressure of the centralized control device, thereby reducing a delay in a data stream scheduling process and relieving the processing pressure of the centralized control device and a congestion problem of a forwarding link during forwarding of a data stream.

Persons of ordinary skill in the art may understand that, all or a part of the steps of the foregoing method embodiments may be implemented by a program instructing relevant hardware. The foregoing program may be stored in a computer readable storage medium. When the program is run, the steps of the foregoing method embodiments are performed. The foregoing storage medium may be any medium capable of storing program codes, such as a ROM, a RAM, a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. A data stream scheduling method, comprising:
receiving, by a data stream scheduling entity in a network, a data packet that is currently transmitted and obtaining data stream information of a data stream where the data packet is located;
determining a type of the data stream according to the data stream information, wherein the type of the data stream comprises a specific data stream and a common data stream, the specific data stream is a data stream on which special scheduling needs to be executed to ensure the quality of service, and the common data stream is a data stream on which special scheduling does not need to be executed;
when the data stream is a specific data stream and the data stream is determined as a specific data stream for the first time, applying to a centralized control device for forwarding policy, so as to forward the specific data stream according to the forwarding policy determined by the centralized control device;
when the data stream is a specific data stream and the data stream is not determined as a specific data stream for the first time, forwarding the specific data stream according to a preset forwarding policy; and
when the data stream is a common data stream, forwarding the data stream according to a default forwarding policy.

2. The method according to claim 1, wherein when the data stream information comprises the number of data packets that are currently transmitted by the data stream and the number of data packets that have already been transmitted by the data stream, determining a type of the data stream according to the data stream information comprises:
if a weight of the data stream is greater than or equal to a preset weight threshold, determining that the type of the data stream is a specific data stream, wherein the weight is a sum of the number of data packets that are currently transmitted by the data stream and the number of data packets that have already been transmitted by the data stream; and
if the weight of the data stream is smaller than the preset weight threshold, determining that the type of the data stream is a common data stream.

3. The method according to claim 1, wherein when the data stream information comprises the total traffic of data packets that are currently transmitted by the data stream and the total traffic of data packets that have already been transmitted by the data stream, determining a type of the data stream according to the data stream information comprises:
if a weight of the data stream is greater than or equal to a preset weight threshold, determining that the type of the data stream is a specific data stream, wherein the weight is a sum of the total traffic of data packets that are currently transmitted by the data stream and the total traffic of data packets that have already been transmitted by the data stream; and
if the weight of the data stream is smaller than the preset weight threshold, determining that the type of the data stream is a common data stream.

4. The method according to claim 1, wherein when the data stream information comprises a priority of the data stream, the priority of the data stream is used to indicate a priority of an application or a service to which the data stream belongs, determining a type of the data stream according to the data stream information comprises:
if the priority of the data stream is higher than or equal to a weight threshold, determining that the type of the data stream is a specific data stream; and
if the priority of the data stream is lower than the weight threshold, determining that the type of the data stream is a common data stream.

5. The method according to claim 1, wherein applying to a centralized control device for a forwarding policy, so as to forward the specific data stream according to the forwarding policy determined by the centralized control device comprises:
sending, by the data stream scheduling entity, policy request information to the centralized control device, so as to request the centralized control device to determine a forwarding policy for the specific data stream, and sending the forwarding policy determined by the centralized control device to the network switching device in the network; and
sending, by the data stream scheduling entity, the specific data stream to the network switching device, so that the network switching device forwards the specific data stream according to the forwarding policy determined by the centralized control device.

6. The method according to claim 1, wherein applying to a centralized control device for a forwarding policy, so as to forward the specific data stream according to the forwarding policy determined by the centralized control device comprises:
sending, by the data stream scheduling entity, policy request information to the centralized control device, so as to request the centralized control device to determine a forwarding policy for the specific data stream and send the forwarding policy to the data stream scheduling entity; and
receiving, by the data stream scheduling entity, the forwarding policy sent by the centralized control device, writing the forwarding policy into a forwarding table stored by the data stream scheduling entity, and sending the specific data stream according to the forwarding policy.

7. The method according to claim 1, wherein when the data stream is a common data stream, forwarding the data stream according to a default forwarding policy comprises:
when the type of the data stream is a common data stream, forwarding the common data stream to the network switching device in the network, so that the network switching device forwards the common data stream according to a preset forwarding policy.

8. A data stream scheduling entity, the entity comprising:
a memory for storing instructions; and
a processor configured to execute instructions to perform a method for scheduling data stream, wherein the method comprises:
receiving, a data packet that is currently transmitted and obtain data stream information of a data stream where the data packet is located;
determining, a type of the data stream according to the data stream information, wherein the type of the data stream comprises a specific data stream and a common data stream, the specific data stream is a data stream on which special scheduling needs to be executed to ensure the quality of service, and the common data stream is a data stream on which special scheduling does not need to be executed; and
when the data stream is a specific data stream and the data stream is determined as a specific data stream for the first time, applying to a centralized control device in a network for an forwarding policy, so as to forward the specific data stream according to the forwarding policy determined by the centralized control device;

when the data stream is a specific data stream and the data stream is not determined as a specific data stream for the first time, forwarding the data stream according to a preset forwarding policy; and when the data stream is a common data stream, forwarding the data stream according to a default forwarding policy.

9. The entity according to claim 8, wherein when the data stream information comprises the number of data packets that are currently transmitted by the data stream and the number of data packets that have already been transmitted by the data stream, determining a type of the data stream according to the data stream information comprises:

when a weight of the data stream is greater than or equal to a preset weight threshold, determining that the type of the data stream is a specific data stream, wherein the weight is a sum of the number of data packets that are currently transmitted by the data stream and the number of data packets that have already been transmitted by the data stream; and when the weight of the data stream is smaller than the preset weight threshold, determining that the type of the data stream is a common data stream.

10. The entity according to claim 8, wherein when the data stream information comprises the total traffic of data packets that are currently transmitted by the data stream and the total traffic of data packets that have already been transmitted by the data stream, determining a type of the data stream according to the data stream information comprises:

when a weight of the data stream is greater than or equal to a preset weight threshold, determining that the type of the data stream is a specific data stream, wherein the weight is a sum of the total traffic of data packets that are currently transmitted by the data stream and the total traffic of data packets that have already been transmitted by the data stream; and when the weight of the data stream is smaller than the preset weight threshold, determining that the type of the data stream is a common data stream.

11. The entity according to claim 8, wherein when the data stream information comprises a priority of the data stream, the priority of the data stream is used to indicate a priority of an application or a service to which the data stream belongs, and determining a type of the data stream according to the data stream information comprises:

when the priority of the data stream is higher than or equal to a weight threshold, determining that the type of the data stream is a specific data stream; and when the priority of the data stream is lower than the weight threshold, determining that the type of the data stream is a common data stream.

12. The entity according to claim 8, wherein applying to a centralized control device for a forwarding policy, so as to forward the specific data stream according to the forwarding policy determined by the centralized control device comprises:

sending, policy request information to the centralized control device, so as to request the centralized control device to determine a forwarding policy for the specific data stream; and sending, the forwarding policy determined by the centralized control device to the network switching device in the network; and sending, the specific data stream to the network switching device, so that the network switching device forwards the specific data stream according to the forwarding policy determined by the centralized control device.

13. The entity according to claim 8, wherein applying to a centralized control device for a forwarding policy, so as to forward the specific data stream according to the forwarding policy determined by the centralized control device comprises:

sending, policy request information to the centralized control device, so as to request the centralized control device to determine the forwarding policy for the specific data stream and send the forwarding policy to the data stream scheduling entity;

receiving, the forwarding policy sent by the centralized control device; and sending, the specific data stream according to the forwarding policy.

14. The entity according to claim 12, wherein when the data stream is a common data stream, forwarding the data stream according to a default forwarding policy comprises:

when the type of the data stream is a common data stream, forwarding the common data stream to the network switching device in the network, so that the network switching device forwards the common data stream according to a preset forwarding policy.

15. A data stream scheduling system, comprising: a data stream server, a centralized control device, and a network switching device, wherein the centralized control device is connected to the data stream server and the network switching device in a communication manner, and the data stream server is connected to the network switching device in a communication manner;

the data stream server is configured to receive a data packet that is currently transmitted and obtain data stream information of a data stream where the data packet is located; determine a type of the data stream according to the data stream information, wherein the type of the data stream comprises a specific data stream and a common data stream, the specific data stream is a data stream on which special scheduling needs to be executed to ensure the quality of service, and the common data stream is a data stream on which special scheduling does not need to be executed; and when the data stream is a specific data stream and the data stream is determined as a specific data stream for the first time, forward the specific data stream to the network switching device, and send policy request information to the centralized control device, and when the data stream is a specific data stream and the data stream is not determined as a specific data stream for the first time or the data stream is a common data stream, forward the common data stream to the network switching device;

the centralized control device is configured to receive the policy request information sent by the data stream server, determine a forwarding policy according to the policy request information, and send the determined forwarding policy to the network switching device; and the network switching device is configured to receive the specific data stream determined as a specific data stream for the first time that sent by the data stream server and the forwarding policy sent by the centralized control device, and forward the specific data stream determined as a specific data stream for the first time according to the forwarding policy; or receive the specific data stream that is not determined as a specific data stream for the first time and sent by the data stream server, and forward the data stream that is not determined as a specific data stream for the first time according to a preset forwarding policy; or receive the common data stream sent by the data stream server, and forward the common data stream according to a preset forwarding policy.

16. The system according to claim 15, wherein when the data stream information comprises a priority of the data stream, the priority of the data stream is used to indicate a priority of an application or a service to which the data stream belongs, and the data stream server is configured to:
when the priority of the data stream is higher than or equal to a weight threshold, determine that the type of the data stream is a specific data stream; and
when the priority of the data stream is lower than the weight threshold, determine that the type of the data stream is a common data stream.

17. A non-transitory computer readable medium, comprising computer executable instructions, wherein the computer executable instructions are used for enabling a data stream scheduling entity to perform a data stream schedule method, wherein the method comprises:
receiving a data packet that is currently transmitted and obtain data stream information of a data stream where the data packet is located;
determining a type of the data stream according to the data stream information, wherein the type of the data stream comprises a specific data stream and a common data stream, the specific data stream is a data stream on which special scheduling needs to be executed to ensure the quality of service, and the common data stream is a data stream on which special scheduling does not need to be executed; and
when the data stream is a specific data stream and the data stream is determined as a specific data stream for the first time, applying to a centralized control device for forwarding policy, so as to forward the specific data stream according to the forwarding policy determined by the centralized control device;
when the data stream is a specific data stream and the data stream is not determined as a specific data stream for the first time, forwarding the specific data stream according to a preset forwarding policy; and
when the data stream is a common data stream, forwarding the data stream according to a default forwarding policy.

18. The medium according to claim 17, wherein when the data stream information comprises the number of data packets that are currently transmitted by the data stream and the number of data packets that have already been transmitted by the data stream, determining a type of the data stream according to the data stream information comprises:
when a weight of the data stream is greater than or equal to a preset weight threshold, determining that the type of the data stream is a specific data stream, wherein the weight is a sum of the number of data packets that are currently transmitted by the data stream and the number of data packets that have already been transmitted by the data stream; and
when the weight of the data stream is smaller than the preset weight threshold, determining that the type of the data stream is a common data stream.

19. The medium according to claim 17, wherein when the data stream information comprises the total traffic of data packets that are currently transmitted by the data stream and the total traffic of data packets that have already been transmitted by the data stream, determining a type of the data stream according to the data stream information comprises:
when a weight of the data stream is greater than or equal to a preset weight threshold, determining that the type of the data stream is a specific data stream, wherein the weight is a sum of the total traffic of data packets that are currently transmitted by the data stream and the total traffic of data packets that have already been transmitted by the data stream; and
when the weight of the data stream is smaller than the preset weight threshold, determining that the type of the data stream is a common data stream.

20. The medium according to claim 17, wherein when the data stream information comprises a priority of the data stream, the priority of the data stream is used to indicate a priority of an application or a service to which the data stream belongs, and determining a type of the data stream according to the data stream information comprises:
when the priority of the data stream is higher than or equal to a weight threshold, determining that the type of the data stream is a specific data stream; and
when the priority of the data stream is lower than the weight threshold, determining that the type of the data stream is a common data stream.

* * * * *